(12) United States Patent
Zhu

(10) Patent No.: US 11,429,115 B2
(45) Date of Patent: Aug. 30, 2022

(54) VEHICLE-PLATOONS IMPLEMENTATION UNDER AUTONOMOUS DRIVING SYSTEM DESIGNED FOR SINGLE VEHICLE

(71) Applicant: Baidu USA LLC, Sunnyvale, CA (US)

(72) Inventor: Fan Zhu, Sunnyvale, CA (US)

(73) Assignee: BAIDU USA LLC, Sunnyvale, CA (US)

(*) Notice: Subject to any disclaimer, the term of this patent is extended or adjusted under 35 U.S.C. 154(b) by 302 days.

(21) Appl. No.: 16/455,332

(22) Filed: Jun. 27, 2019

(65) Prior Publication Data
US 2020/0409391 A1 Dec. 31, 2020

(51) Int. Cl.
*G05D 1/00* (2006.01)
*G05D 1/02* (2020.01)
*B60W 30/16* (2020.01)

(52) U.S. Cl.
CPC .......... *G05D 1/0291* (2013.01); *B60W 30/16* (2013.01); *G05D 1/0088* (2013.01); *G05D 1/0212* (2013.01); *G05D 1/0285* (2013.01); *B60W 2554/00* (2020.02); *B60W 2554/801* (2020.02); *B60W 2554/804* (2020.02); *B60W 2556/60* (2020.02); *B60W 2556/65* (2020.02)

(58) Field of Classification Search
None
See application file for complete search history.

(56) References Cited

U.S. PATENT DOCUMENTS

| | | | |
|---|---|---|---|
| 10,185,329 B2 | 1/2019 | Giles et al. | |
| 2013/0030606 A1 | 1/2013 | Mudalige et al. | |
| 2021/0163004 A1* | 6/2021 | Wiberg | B60W 30/165 |

FOREIGN PATENT DOCUMENTS

| | | |
|---|---|---|
| DE | 102017004721 | 12/2017 |
| JP | 2007088583 A | 4/2007 |
| JP | 2009151566 A | 7/2009 |
| JP | 2016162196 A | 9/2016 |
| JP | 6556939 B2 | 8/2019 |
| WO | 2015068501 A1 | 5/2015 |
| WO | 2017179193 A1 | 10/2017 |
| WO | 2018179235 A1 | 10/2018 |

OTHER PUBLICATIONS

Alice Agogino, et al., "UC Berkeley Research Reports Title Intelligent Sensor Validation and Sensor Fusion for Reliability and Safety Enhancement in Vehicle Control", Jan. 1, 1995, 9 pages.

* cited by examiner

*Primary Examiner* — James M McPherson
(74) *Attorney, Agent, or Firm* — Womble Bond Dickinson (US) LLP

(57) ABSTRACT

A method, apparatus, and system for enabling platooning between two autonomous vehicles is disclosed. According to one embodiment, a second ADV receives a vehicle status and a first perception result of a first ADV over a vehicle-to-vehicle (V2V) link. The first perception result includes one or more obstacles perceived by the first ADV. A perception process is performed by the second ADV to perceive a driving environment associated with the second ADV, which generates a second perception result. The first perception result performed by the first ADV and the second perception result performed by the second ADV are merged to generate a third perception result. A trajectory is planned based on the vehicle status of the first ADV and the third perception result to cause the second ADV to follow the first ADV in a platoon manner.

20 Claims, 8 Drawing Sheets

VEHICLE-PLATOONS IMPLEMENTATION UNDER AUTONOMOUS DRIVING SYSTEM DESIGNED FOR SINGLE VEHICLE

TECHNICAL FIELD

Embodiments of the present disclosure relate generally to operating autonomous vehicles. More particularly, embodiments of the disclosure relate to enabling platooning at autonomous vehicles that are designed for single vehicle operations.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Grouping vehicles into platoons, or platooning, also known as flocking, is a method of increasing the capacity of roads. Platoons decrease the distances between vehicles using electronic, and possibly mechanical, coupling. This capability would allow many vehicles to accelerate or brake simultaneously. This system also allows for a closer headway between vehicles by eliminating reacting distance needed for human reaction.

Modifications to the control system of autonomous vehicles designed for single vehicle operations are required to enable these autonomous vehicles to operate in a platoon mode.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Figure 1:
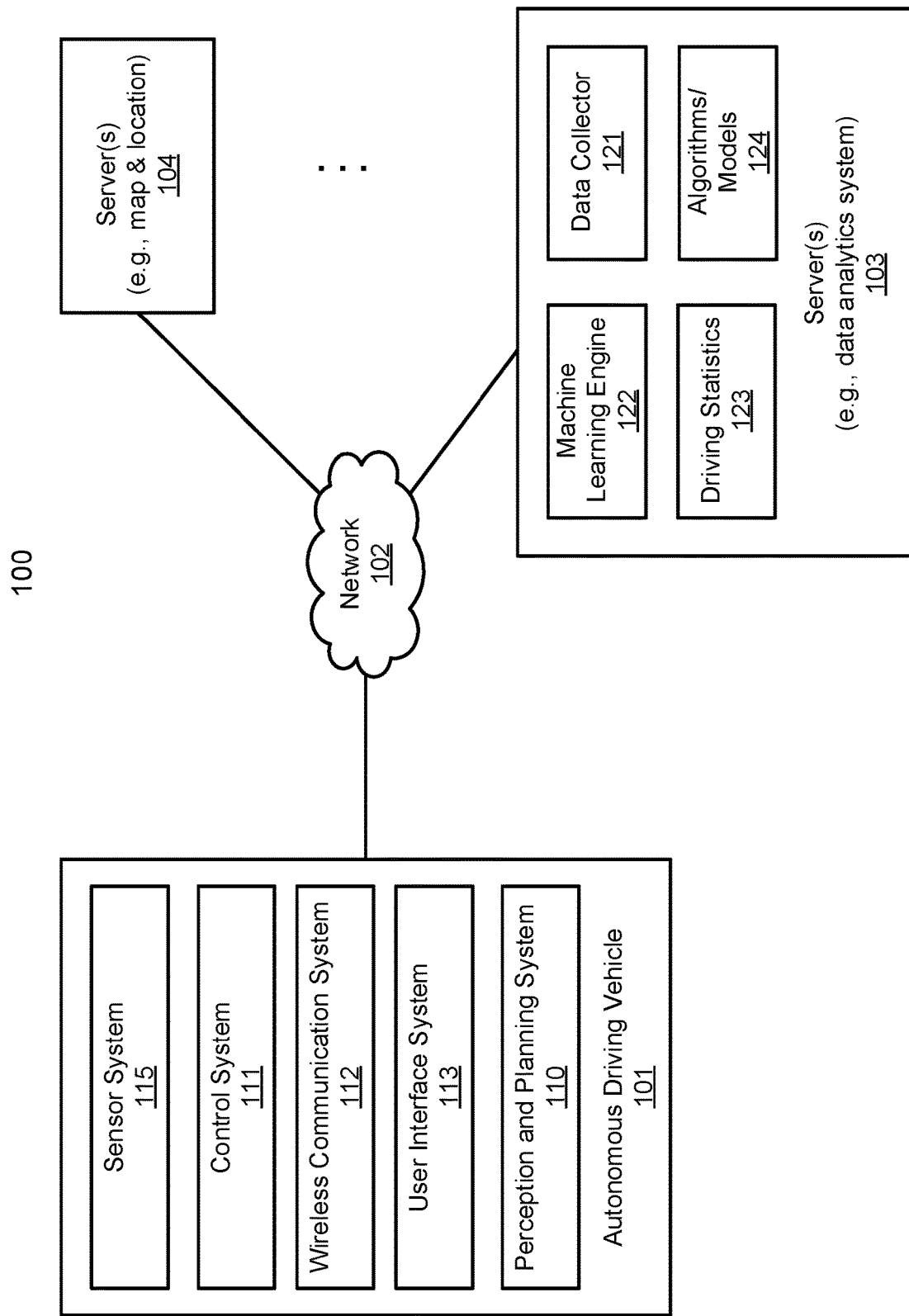
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

Embodiments of the disclosure relate to a method, apparatus, and system for enabling platooning between two autonomous vehicles. According to one embodiment, a second ADV receives a vehicle status and a first perception result of a first ADV over a vehicle-to-vehicle (V2V) link. The first perception result includes one or more obstacles perceived by the first ADV. A perception process is performed by the second ADV to perceive a driving environment associated with the second ADV, which generates a second perception result. The first perception result performed by the first ADV and the second perception result performed by the second ADV are merged to generate a third perception result. A trajectory is planned based on the vehicle status of the first ADV and the third perception result to cause the second ADV to follow the first ADV in a platoon manner.

According to embodiment, a path planning result performed by the first ADV is also received from the first ADV over the V2V link. The path planning result includes a trajectory planned by the first ADV. The movement of the first ADV is predicted based on the path planning result of the first ADV. A predicted trajectory of the first ADV is generated based on the prediction. The predicted trajectory represents a trajectory of the first ADV predicted by the second ADV. The first perception result represents a front angle perception perceived from a front view of the first ADV.

In one embodiment, in merging the first perception result and the second perception result, the received vehicle status is utilized to replace the perceived data perceiving the first ADV in the second perception result of the second ADV. A minimum distance buffer is reduced between the first ADV and the second ADV to a predetermined platoon distance. The vehicle status of the first ADV includes a localization of the first ADV in a global coordinate system, a speed of the first ADV, and/or a heading direction of the first ADV. The minimum distance buffers between the second ADV and the obstacles remained relatively unchanged.

In one embodiment, if there is a third ADV configured to follow the second ADV, the vehicle status, perception result, and/or planning information of the second ADV may be transmitted from the second ADV to the third ADV over a V2V link to enable the third ADV to plan and follow the second ADV in a platoon manner.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, infotainment system 114, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
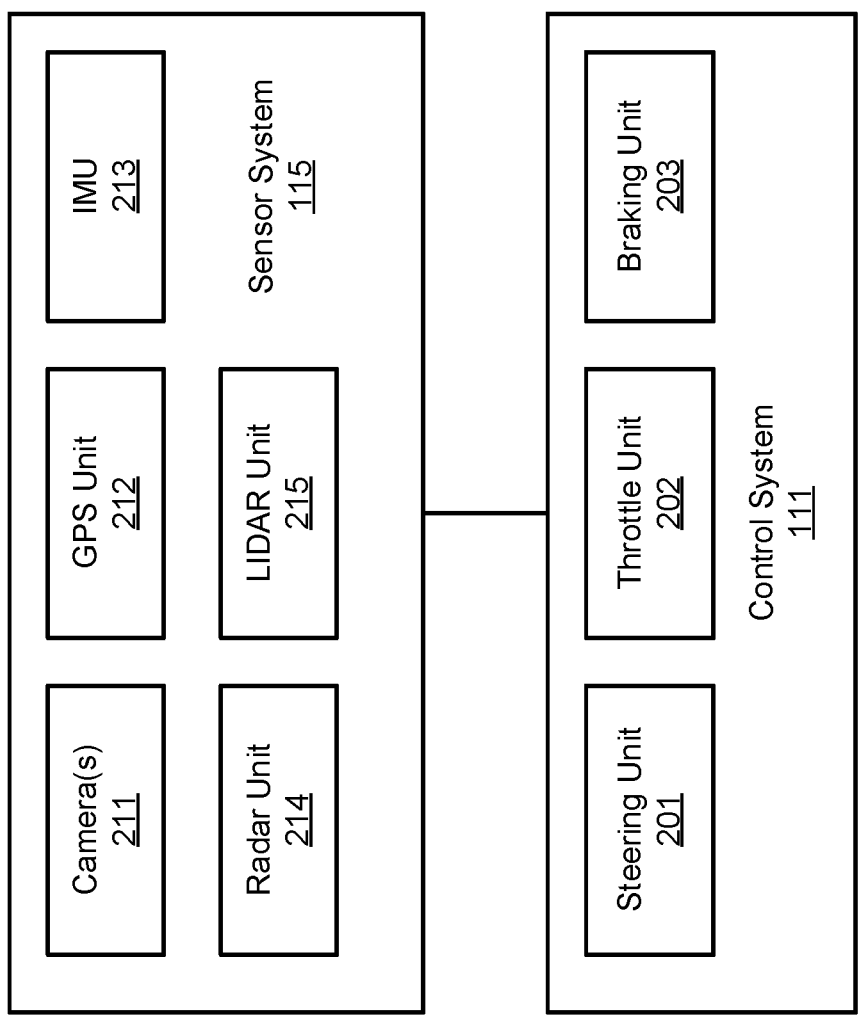
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn controls the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. In one embodiment, algorithms 124 may include a method to enable the autonomous vehicle 101 to operate in a platoon mode.

Algorithms 124 can then be uploaded on ADVs to be utilized during autonomous driving in real-time.

Figure 3A:
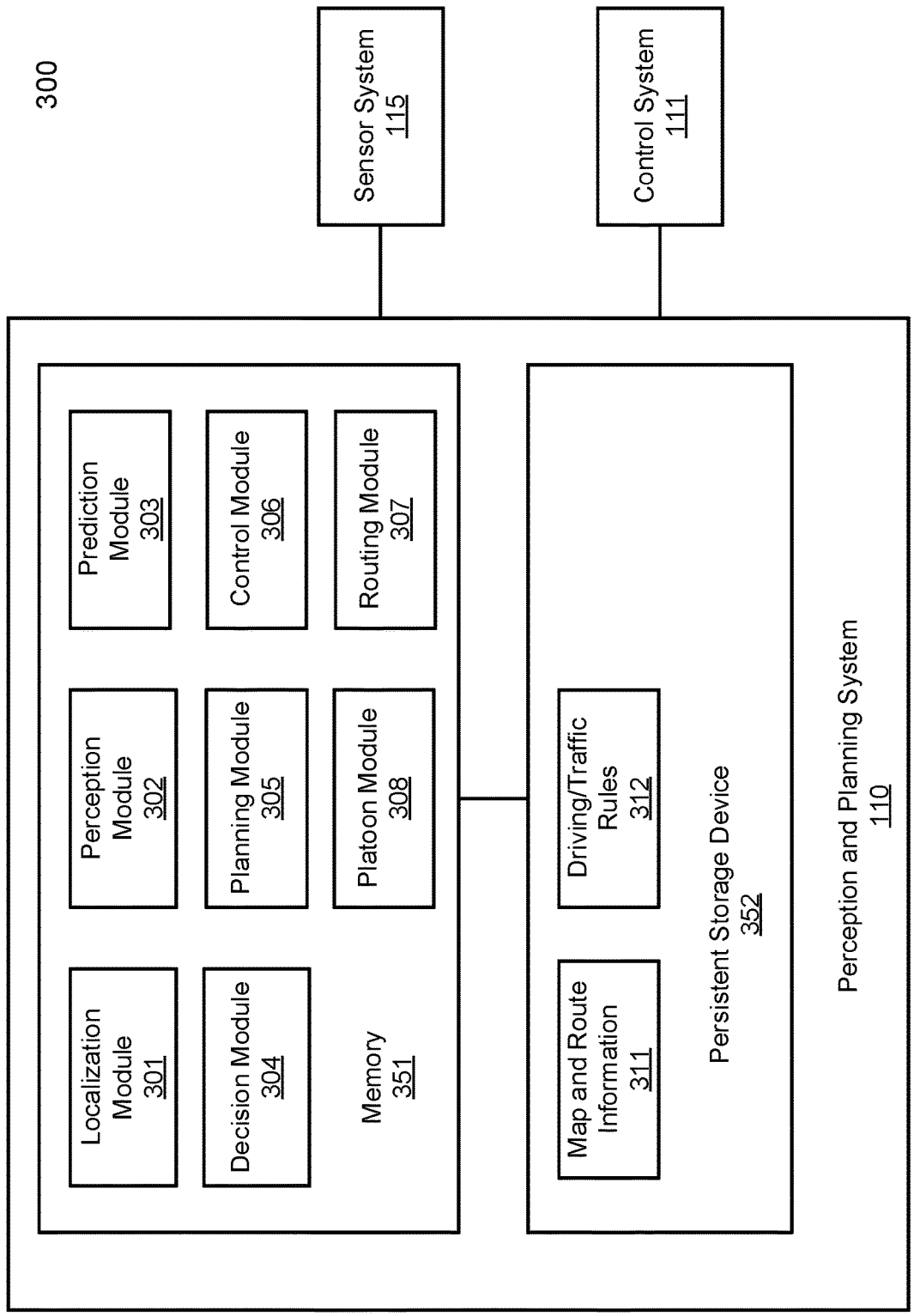
FIGS. 3A-3B are block diagrams illustrating an example of a perception and planning system used with an autonomous vehicle according to one embodiment.
Figure 3B:
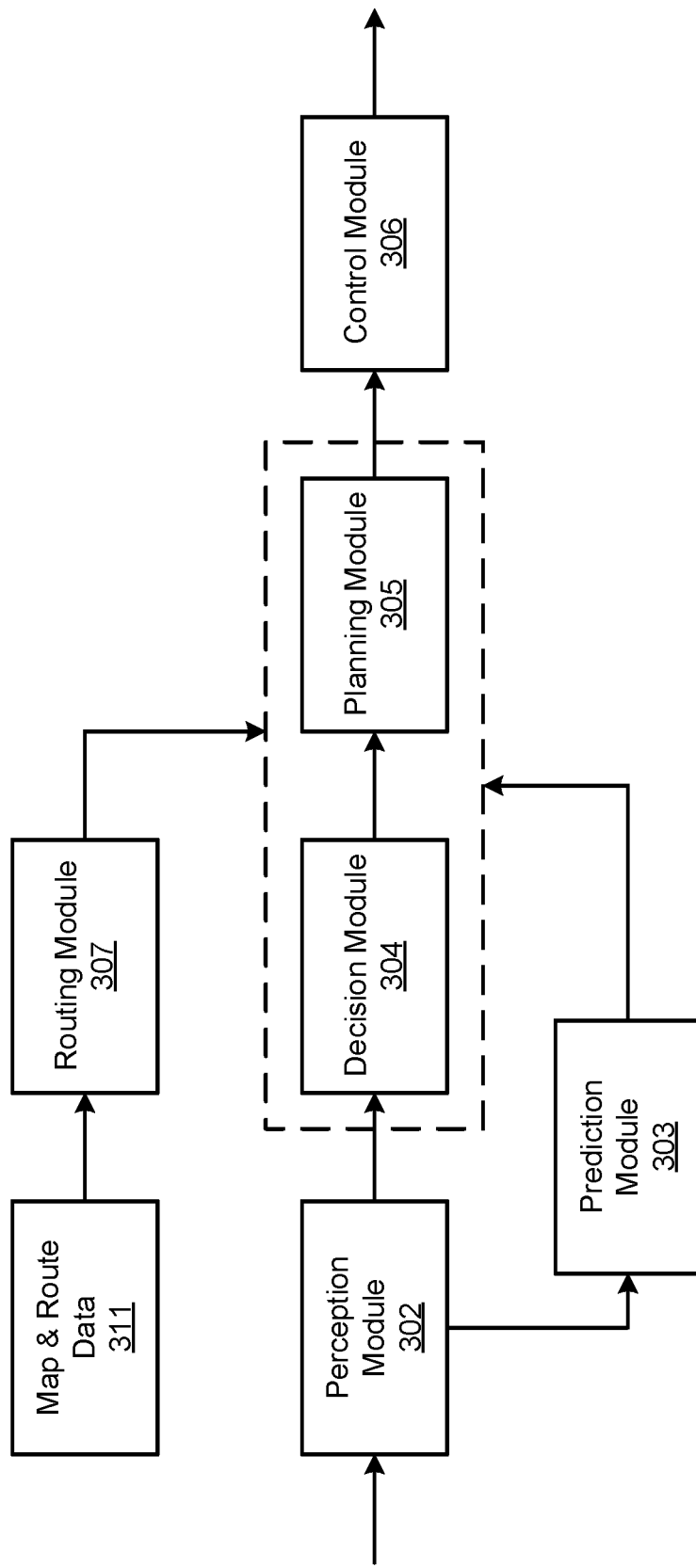

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, routing module 307, and platoon module 308.

Some or all of modules 301-308 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-308 may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to affect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

According to one embodiment, platoon module 308 is configured to perform a platoon process to allow the ADV to follow another vehicle in a platoon manner. Platoon module 308 may be implemented as a part of perception module 302. Alternatively, platoon module 308 may be a separate module communicatively coupled to perception module 302, prediction module 303, and planning module 305. Platoon module 308 may receive and utilize at least a portion of perception, prediction, and planning information from a leading vehicle, in combination its own perception, prediction, and planning information, to plan ADV 300 to follow the leading vehicle in a platoon manner.

Figure 4:
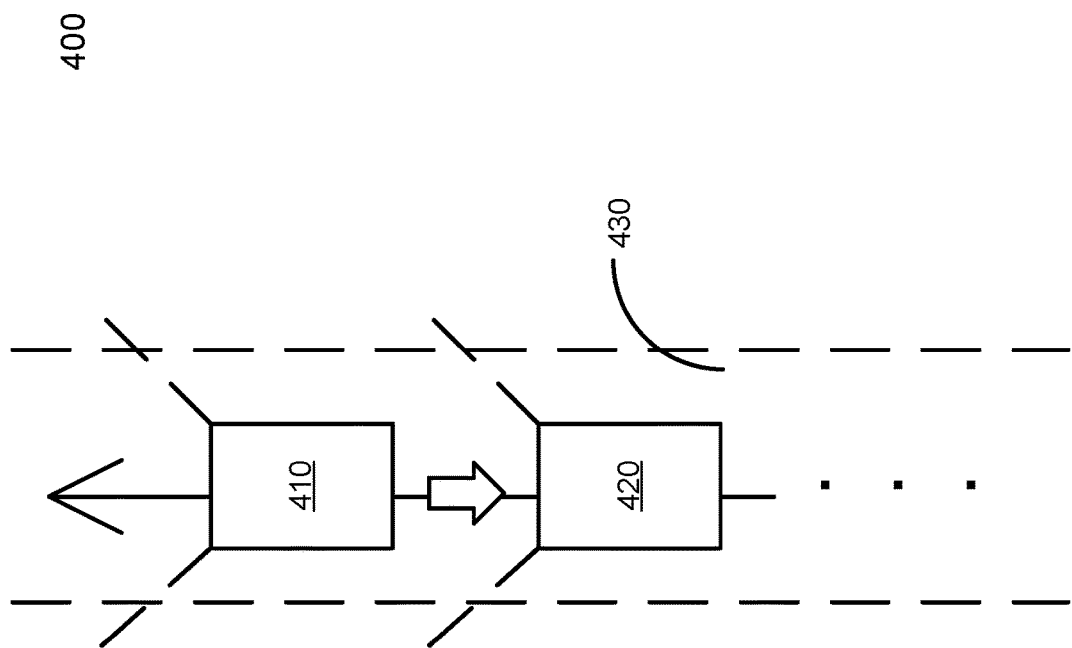
FIG. 4 is a block diagram illustrating an example environment in which embodiments of the disclosure may be practiced.

Referring to FIG. 4, a block diagram illustrating an example environment 400 in which embodiments of the disclosure may be practiced is shown. A number of autonomous vehicles travel in a platoon mode on a roadway 430. In the direction of travel, a first vehicle 410 is a leading vehicle, and a second vehicle 420 is a following vehicle directly behind the first vehicle. The platoon may comprise one or more additional following vehicles behind the second vehicle 420. The first vehicle 410 may transmit to the second vehicle 420 through a vehicle-to-vehicle data link the following: 1) a current vehicle status of the first vehicle 410, which may include one or more of: a localization in a global coordinate system, a speed, a heading, etc., or a combination thereof; 2) the front angle perception results (i.e., the perception of what is in front of the first vehicle 410); and 3) autonomous driving path planning results of vehicle 410.

Providing the second vehicle 420 with the front angle perception results of the first vehicle 410 would improve the perception of the second vehicle 420 as it effectively allows the second vehicle 420 to "see through" the first vehicle 410. In one embodiment, the first vehicle 410 may not send the raw point cloud or image input associated with the front angle perception in order to reduce the communication message size. Rather, vehicle 410 only sends a result of the perception process, which includes at least information describing one or more obstacles detected by a perception module of vehicle 410. For example, a perception result may include a location (x, y), speed, and heading direction of each obstacle detected. For a static obstacle, the speed and heading direction may be zero, which may be utilized as an indication of a static object. Vehicle 410 may include autonomous driving functionalities as described above and may include at least some of the autonomous driving modules as shown in FIGS. 3A-3B.

Figure 5:
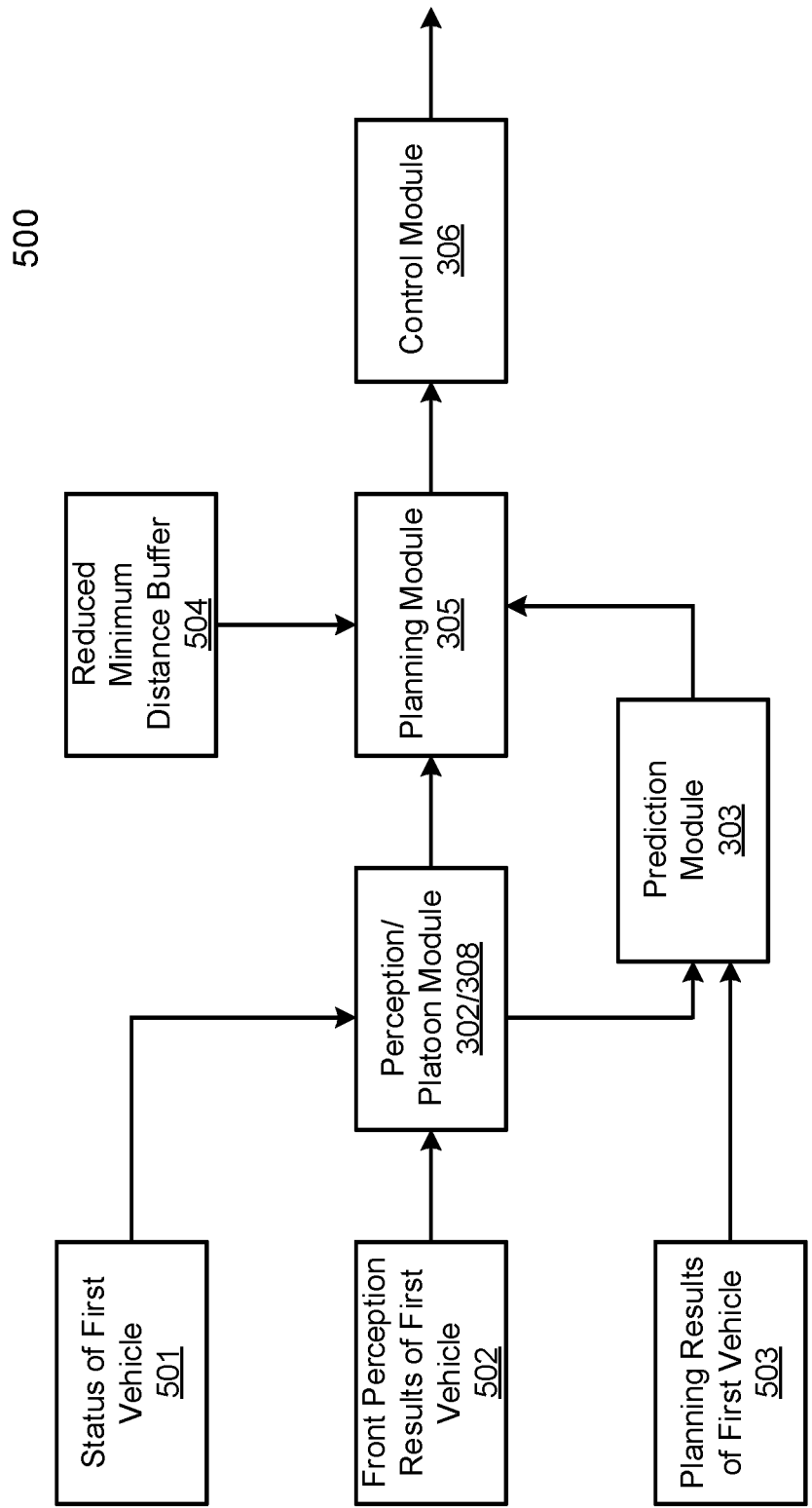
FIG. 5 is a block diagram illustrating various modules utilized with embodiments of the disclosure.

Referring to FIG. 5, a block diagram 500 illustrating various modules utilized with embodiments of the disclosure is shown. A vehicle status of the first vehicle 501, front angle perception results of the first vehicle 502, and path planning results of a first vehicle 503 are received at the second vehicle from the first vehicle. The vehicle status of the first vehicle 501 and front angle perception results of the first vehicle 502 are forwarded to the perception module 302 of the second vehicle. In this example, platoon module 308 is implemented as a part of perception module 302. There, the front angle perception results of the first vehicle 502 are merged with perception results of the second vehicle, and the received vehicle status of the first vehicle 501 is substituted for perceived data associated with the first vehicle in a list of identified objects in the perception results of the second vehicle.

The path planning results of first vehicle 503 is forwarded to the prediction module 303 of the second vehicle, where a trajectory of the first vehicle is predicted based at least in part on the path planning results of the first vehicle 503. It should be appreciated that in predicting the trajectory of the first vehicle, each trajectory point received from the first vehicle needs to be matched against its timestamp. The perception results, the predicted trajectory of the first vehicle, and the reduced minimum distance buffer between the second vehicle and the first vehicle 504 are forwarded to the planning module 305 of the second vehicle. Thereafter, a trajectory of the second vehicle is planned at the planning module 305 based at least in part on the received vehicle status of the first vehicle 501, the predicted trajectory of the first vehicle, and the reduced minimum distance buffer 504. Control signals to autonomously drive the second vehicle are then generated at the control module 306 based on the planned trajectory of the second vehicle. Accordingly, the first and second vehicles operate in a platoon mode and form at least part of a platoon.

In one embodiment, the received vehicle status of the first vehicle 501 includes one or more of: a localization of the first vehicle in a global coordinate system, a speed of the first vehicle, a heading of the first vehicle, or any combination thereof. In one embodiment, one or more minimum distance buffers between the second vehicle and one or more identified objects other than the first vehicle are kept unchanged (i.e., a default minimum buffer is used) at the second vehicle.

In one embodiment, the platoon includes one or more additional following vehicles behind the second vehicle. A third vehicle directly behind the second vehicle in the platoon receives a vehicle status, front angle perception results, and path planning results of the second vehicle from the second vehicle. The third vehicle plans its trajectory based at least in part on the receive vehicle status of the second vehicle, a predicted trajectory of the second vehicle, and a reduced minimum distance buffer between the third vehicle and the second vehicle. Of course, it should be appreciated that the number of vehicles in the platoon does not limit the disclosure, and it is within the skills of a person skilled in the art to adapt the techniques disclosed herein to scenarios involving different numbers of vehicles in the platoon.

Figure 6:
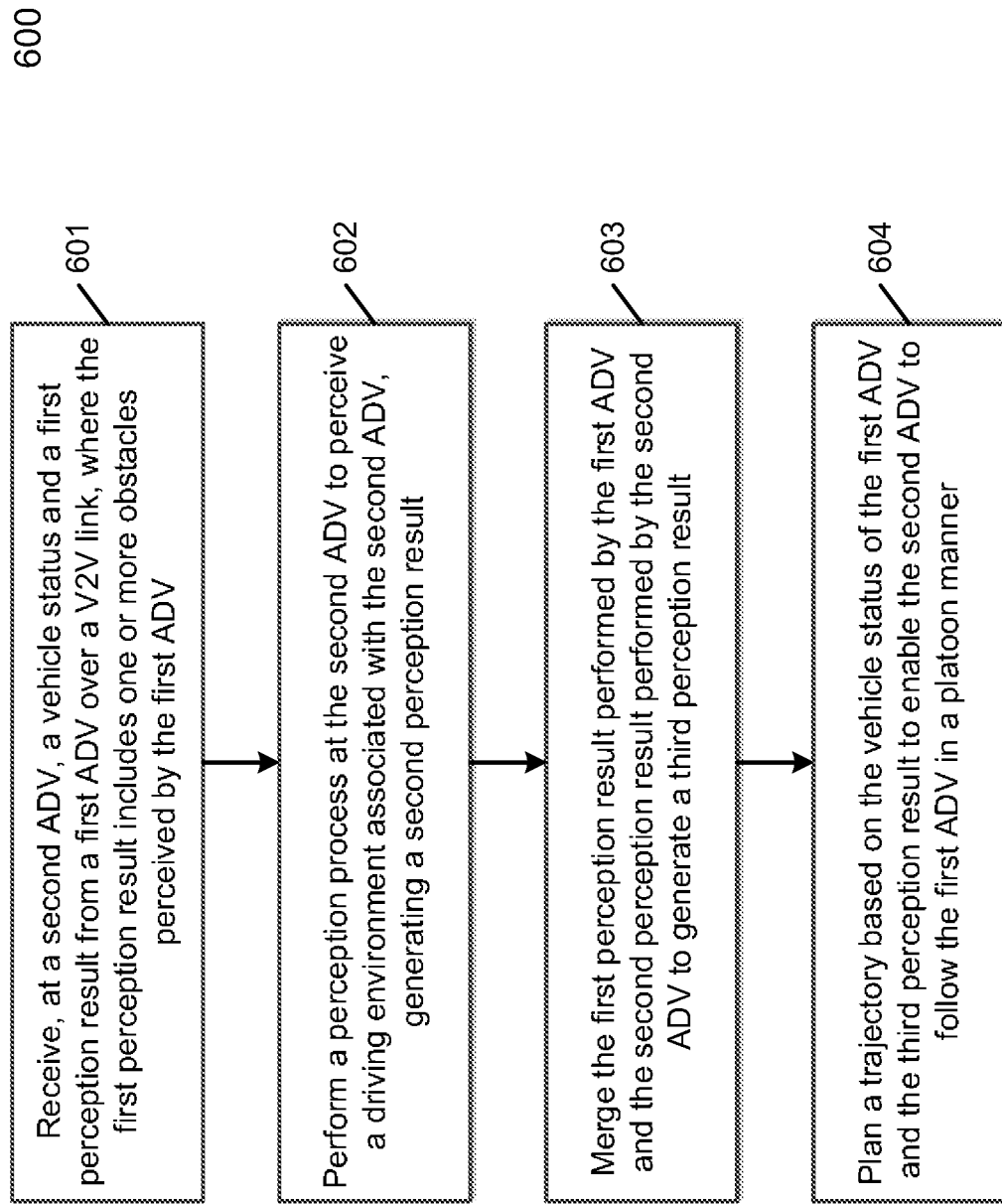
FIG. 6 is a flow diagram illustrating an example of a process for platoon processing according to one embodiment.

FIG. 6 is a flow diagram illustrating an example of a platoon process according to one embodiment. Process 600 may be performed by processing logic which may include software, hardware, or a combination thereof. Referring to FIG. 6, at block 601, processing logic receives at a second ADV a vehicle status and a first reception result from a first ADV over a vehicle-to-vehicle (V2V) link. The first perception result includes one or more obstacles perceived by the first ADV. At block 602, processing logic performs a perception process at the second ADV to perceive a driving environment associated with the second ADV, which generates a second perception result. At block 603, the first perception result performed by the first ADV and the second perception result performed by the second ADV are merged to generate a third perception result. At block 604, a trajectory is planned based on the vehicle status of the first ADV and the third perception result to enable the second ADV to follow the first ADV in a platoon manner.

Figure 7:
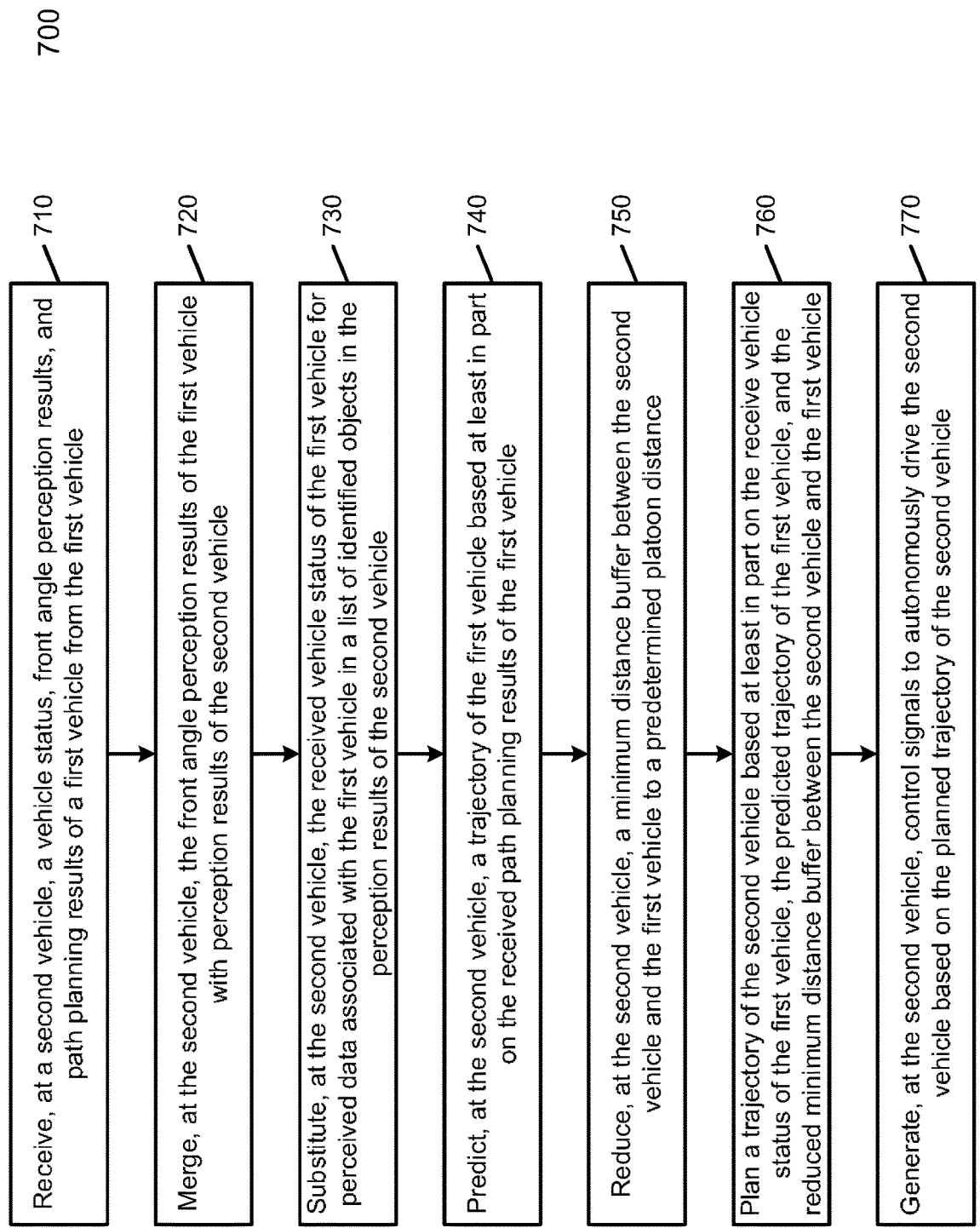
FIG. 7 is a flowchart illustrating an example method for enabling platooning between two autonomous vehicles according to one embodiment.

Referring to FIG. 7, a flowchart illustrating an example method 700 for enabling platooning between two autonomous vehicles is shown. The method can be implemented in software, hardware, or a combination of both. At block 710, at a second vehicle, a vehicle status, front angle perception results, and path planning results of a first vehicle are received from the first vehicle. At block 720, at the second vehicle, the front angle perception results of the first vehicle are merged with perception results of the second vehicle. At block 730, at the second vehicle, the received vehicle status of the first vehicle is substituted for perceived data associated with the first vehicle in a list of identified objects in the perception results of the second vehicle. At block 740, at the second vehicle, a trajectory of the first vehicle is predicted based at least in part on the received path planning results of the first vehicle. At block 750, at the second vehicle, a minimum distance buffer between the second vehicle and the first vehicle is reduced to a predetermined platoon distance (from a default value). At block 760, at the second vehicle, a trajectory of the second vehicle is planned based at least in part on the receive vehicle status of the first vehicle, the predicted trajectory of the first vehicle, and the reduced minimum distance buffer between the second vehicle and the first vehicle. At block 770, at the second vehicle, control signals to autonomously drive the second vehicle are generated based on the planned trajectory of the second vehicle.

Therefore, embodiments of the disclosure relate to a method, apparatus, system that is simple modification to an autonomous driving system designed for single vehicle operations, and enables the autonomous driving system to operate in a platoon mode. Accordingly, benefits associated with platooning can be achieved.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method for operating an autonomous driving vehicle (ADV) to follow another ADV in a platoon manner, the method comprising:
    receiving, at a second ADV, a vehicle status and a first perception result from a first ADV over a vehicle-to-vehicle (V2V) link, the first perception result including one or more obstacles perceived by the first ADV;
    performing a perception process at the second ADV to perceive a driving environment associated with the second ADV and obtain a second perception result comprising perception data obtained by perceiving the first ADV;
    merging, by the second ADV, the first perception result and the second perception result to generate a third perception result, the third perception result comprising the second perception result with the vehicle status replacing the perception data;
    receiving a path planning result from the first ADV over the V2V link, the path planning result being a plan from a starting point to a destination point including a first trajectory planned by the first ADV to autonomously drive the first ADV during a future period of time; and
    planning, by the second ADV, a second trajectory for the second ADV during the future period of time based on the vehicle status of the first ADV, the third perception result, and a predicted trajectory of the first ADV based on the path planning result from the first ADV to cause the second ADV to follow the first ADV in a platoon manner during the future period of time.

2. The method of claim 1, further comprising:
    predicting movement of the first ADV based on the first trajectory provided by the path planning result of the first ADV.

3. The method of claim 2, further comprising generating a predicted trajectory based on the predicted movement of the first ADV, the predicted trajectory representing a trajectory of the first ADV predicted by the second ADV, wherein the second trajectory is planned in view of the predicted trajectory of the first ADV.

4. The method of claim 1, wherein the first perception result represents a front angle perception perceived from a front view of the first ADV.

5. The method of claim 1, further comprising reducing a minimum distance buffer between the second ADV and the first ADV to a predetermined platoon distance, wherein the second trajectory is planned in view of the predetermined platoon distance between the first ADV and the second ADV.

6. The method of claim 1, wherein the received vehicle status of the first ADV comprises one or more of: a localization of the first ADV in a global coordinate system, a speed of the first ADV, or a heading of the first ADV.

7. The method of claim 1, further comprising transmitting to a third ADV directly behind the second ADV a second vehicle status, the second perception result, and metadata describing the second trajectory of the second ADV, which are utilized by the third ADV to follow the second ADV in the platoon manner.

8. A non-transitory machine-readable medium having instructions stored therein, which when executed by a processor, cause the processor to perform operations, the operations comprising:
    receiving, at a second ADV, a vehicle status and a first perception result from a first ADV over a vehicle-to-vehicle (V2V) link, the first perception result including one or more obstacles perceived by the first ADV;
    performing a perception process at the second ADV to perceive a driving environment associated with the second ADV and obtain a second perception result comprising perception data obtained by perceiving the first ADV;
    merging, by the second ADV, the first perception result and the second perception result to generate a third perception result, the third perception result comprising the second perception result with the vehicle status replacing the perception data;
    receiving a path planning result from the first ADV over the V2V link, the path planning result being a plan from a starting point to a destination point including a first trajectory planned by the first ADV to autonomously drive the first ADV in a future period of time; and
    planning, by the second ADV, a second trajectory for the second ADV during the future period of time based on the vehicle status of the first ADV, the third perception result, and a predicted trajectory of the first ADV based on the path planning result from the first ADV to cause the second ADV to follow the first ADV in a platoon manner during the future period of time.

9. The machine-readable medium of claim 8, wherein the operations further comprise:

predicting movement of the first ADV based on the first trajectory provided by the path planning result of the first ADV.

10. The machine-readable medium of claim 9, wherein the operations further comprise generating a predicted trajectory based on the predicted movement of the first ADV, the predicted trajectory representing a trajectory of the first ADV predicted by the second ADV, wherein the second trajectory is planned in view of the predicted trajectory of the first ADV.

11. The machine-readable medium of claim 8, wherein the first perception result represents a front angle perception perceived from a front view of the first ADV.

12. The machine-readable medium of claim 8, wherein the operations further comprise reducing a minimum distance buffer between the second ADV and the first ADV to a predetermined platoon distance, wherein the second trajectory is planned in view of the predetermined platoon distance between the first ADV and the second ADV.

13. The machine-readable medium of claim 8, wherein the received vehicle status of the first ADV comprises one or more of: a localization of the first ADV in a global coordinate system, a speed of the first ADV, or a heading of the first ADV.

14. The machine-readable medium of claim 8, wherein the operations further comprise maintaining one or more minimum distance buffers between the second ADV and one or more identified obstacles relatively unchanged.

15. The machine-readable medium of claim 8, wherein the operations further comprise transmitting to a third ADV directly behind the second ADV a second vehicle status, the second perception result, and metadata describing the second trajectory of the second ADV, which are utilized by the third ADV to follow the second ADV in the platoon manner.

16. A data processing system, comprising:
a processor; and
a memory coupled to the processor to store instructions, which when executed by the processor, cause the processor to perform operations, the operations including
receiving, at a second ADV, a vehicle status and a first perception result from a first ADV over a vehicle-to-vehicle (V2V) link, the first perception result including one or more obstacles perceived by the first ADV,
performing a perception process at the second ADV to perceive a driving environment associated with the second ADV and obtain a second perception result comprising perception data obtained by perceiving the first ADV,
merging, by the second ADV, the first perception result and the second perception result to generate a third perception result, the third perception result comprising the second perception result with the vehicle status replacing the perception data,
receiving a path planning result from the first ADV over the V2V link, the path planning result being a plan from a starting point to a destination point including a first trajectory planned by the first ADV to autonomously drive the first ADV in a future period of time; and
planning, by the second ADV, a second trajectory for the second ADV during the future period of time based on the vehicle status of the first ADV, the third perception result, and a predicted trajectory of the first ADV based on the path planning result from the first ADV to cause the second ADV to follow the first ADV in a platoon manner during the future period of time.

17. The system of claim 16, wherein the operations further comprise:
predicting movement of the first ADV based on the first trajectory provided by the path planning result of the first ADV.

18. The compute-implemented method of claim 1, further comprising:
driving the second ADV with the first ADV in the platoon manner during the future period of time.

19. The machine-readable medium of claim 8, wherein the operations further comprise:
driving the second ADV with the first ADV in the platoon manner during the future period of time.

20. The data processing system of claim 16, wherein the operations further comprise:
driving the second ADV with the first ADV in the platoon manner during the future period of time.

* * * * *